(12) United States Patent
Reddy et al.

(10) Patent No.: US 9,969,923 B2
(45) Date of Patent: May 15, 2018

(54) SEALANT COMPOSITIONS FOR USE IN SUBTERRANEAN FORMATION OPERATIONS

(71) Applicant: Halliburton Energy Services, Inc., Houston, TX (US)

(72) Inventors: B. Raghava Reddy, The Woodlands, TX (US); Larry S. Eoff, Porter, TX (US); Christopher A. Lewis, Houston, TX (US); Robert Maier, Ortona (IT)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 14/907,379

(22) PCT Filed: Oct. 30, 2013

(86) PCT No.: PCT/US2013/067538
§ 371 (c)(1),
(2) Date: Jan. 25, 2016

(87) PCT Pub. No.: WO2015/065378
PCT Pub. Date: May 7, 2015

(65) Prior Publication Data
US 2016/0177166 A1 Jun. 23, 2016

(51) Int. Cl.
*C09K 8/44* (2006.01)
*C09K 8/512* (2006.01)
(Continued)

(52) U.S. Cl.
CPC ........... *C09K 8/44* (2013.01); *C09K 8/512* (2013.01); *C09K 8/518* (2013.01); *E21B 33/14* (2013.01)

(58) Field of Classification Search
CPC ...................................................... C09K 8/518
See application file for complete search history.

(56) References Cited

U.S. PATENT DOCUMENTS 5,105,884 A   4/1992   Sydansk
5,203,834 A   4/1993   Hutchins et al.
(Continued)

FOREIGN PATENT DOCUMENTS

EP      0875658 A2     11/1998
WO    2004025075 A1     3/2004
(Continued)

OTHER PUBLICATIONS

International Search Report and Written Opinion for PCT/US2013/067538 dated Jul. 28, 2014.

*Primary Examiner* — Angela M DiTrani
*Assistant Examiner* — Andrew Sue-Ako
(74) *Attorney, Agent, or Firm* — McDermott Will & Emery LLP

(57) ABSTRACT

Embodiments herein include methods comprising providing a sealant composition comprising an aqueous base fluid, a crosslinkable polymer composition, and a density segregation prevention agent, wherein the crosslinkable polymer composition comprises a crosslinkable organic polymer and a crosslinker; introducing a particulate density reducing agent into the sealant composition, wherein the particulate density reducing agent causes the sealant composition to adopt a reduced density as compared to the sealant composition without the particulate density reducing agent, thereby creating a reduced density sealant composition; introducing the reduced density sealant composition into a subterranean formation; and crosslinking the reduced density sealant composition into a gel to form a seal in the subterranean formation.

18 Claims, 1 Drawing Sheet

(51) Int. Cl.
*C09K 8/518* (2006.01)
*E21B 33/14* (2006.01)

(56) References Cited

U.S. PATENT DOCUMENTS

| | | |
|---|---|---|
| 5,513,705 A | 5/1996 | Djabbarah et al. |
| 5,588,488 A | 12/1996 | Vijn et al. |
| 5,836,392 A | 11/1998 | Urlwin-Smith |
| 6,063,738 A | 5/2000 | Chatterji et al. |
| 6,176,315 B1 | 1/2001 | Reddy et al. |
| 6,184,287 B1 | 2/2001 | Westerman |
| 6,192,986 B1 | 2/2001 | Urlwin-Smith |
| 6,196,317 B1 | 3/2001 | Hardy |
| 6,268,314 B1 | 7/2001 | Hughes et al. |
| 6,488,764 B2 | 12/2002 | Westerman |
| 6,776,237 B2 | 8/2004 | Dao et al. |
| 7,022,755 B1 | 4/2006 | Chatterji et al. |
| 7,183,001 B1 | 2/2007 | Ederle et al. |
| 7,287,587 B2 | 10/2007 | Reddy et al. |
| 7,395,863 B2 | 7/2008 | Wang et al. |
| 8,343,896 B2 | 1/2013 | Eoff et al. |
| 8,522,874 B2 | 9/2013 | Reddy et al. |
| 2005/0159319 A1* | 7/2005 | Eoff ............... C09K 8/5083 507/225 |
| 2006/0162930 A1 | 7/2006 | Gronsveld et al. |
| 2008/0202752 A1* | 8/2008 | Lopez ............... C04B 28/04 166/292 |
| 2009/0038800 A1 | 2/2009 | Ravi et al. |
| 2010/0016183 A1* | 1/2010 | Roddy ............... C04B 20/10 507/225 |
| 2010/0036017 A1 | 2/2010 | Eoff et al. |
| 2012/0090841 A1 | 4/2012 | Reddy et al. |
| 2013/0000911 A1 | 1/2013 | Reddy et al. |

FOREIGN PATENT DOCUMENTS

| | | |
|---|---|---|
| WO | 2007085983 A1 | 8/2007 |
| WO | 2011036462 A1 | 3/2011 |
| WO | 2012013929 A1 | 2/2012 |
| WO | 2015065351 A1 | 5/2015 |
| WO | 2015065378 A1 | 5/2015 |

* cited by examiner

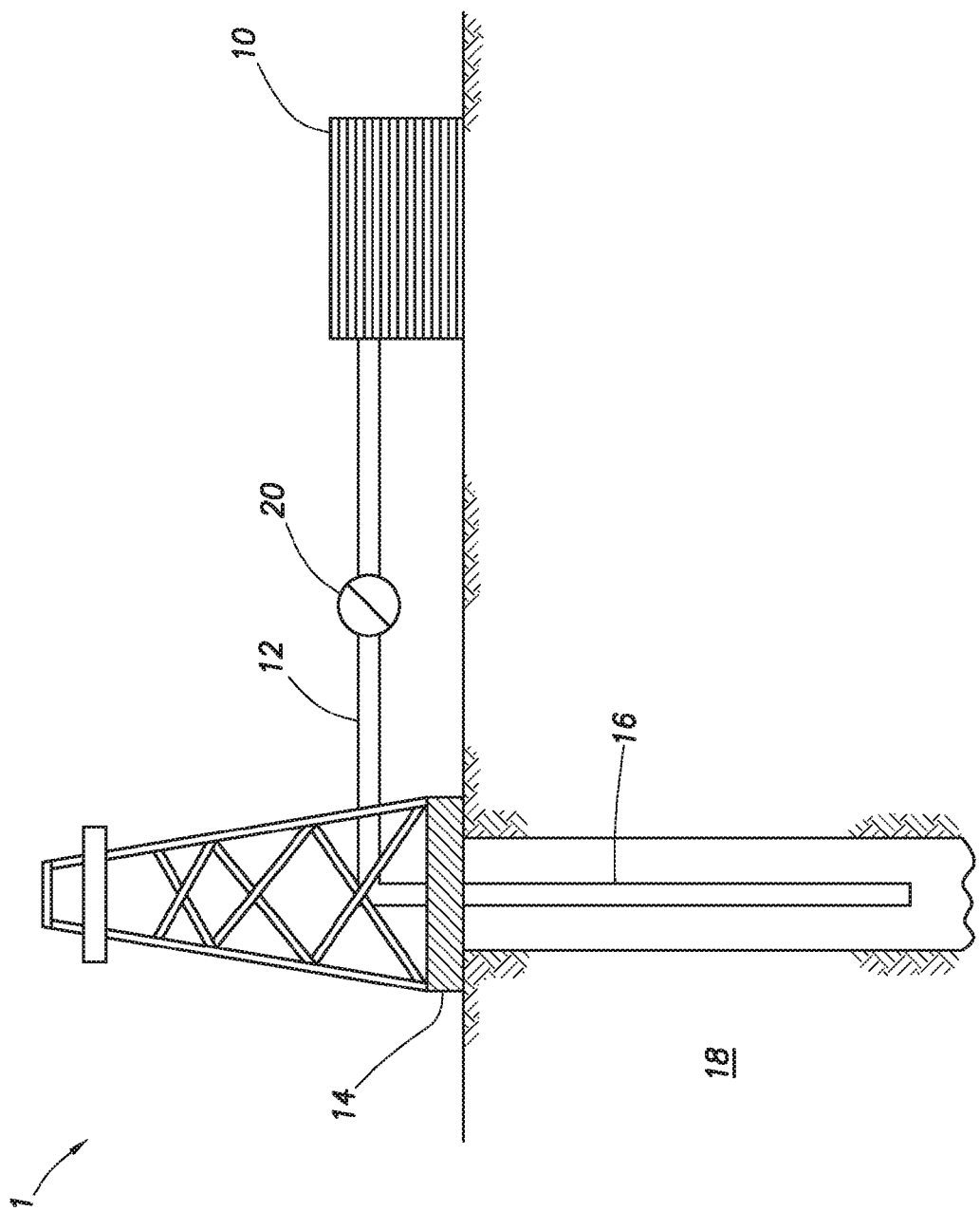

SEALANT COMPOSITIONS FOR USE IN SUBTERRANEAN FORMATION OPERATIONS

BACKGROUND

The embodiments herein relate to sealant compositions for use in subterranean formation operations.

A natural resource, such as oil, residing in a subterranean formation may be recovered by drilling a well into the subterranean formation. The well may be isolated from the surrounding subterranean formation using an operation known as cementing. In a cementing operation, a cement sheath around a casing (or liner string) may be placed within the well. The cement sheath is formed by pumping a cement slurry through the bottom of the casing and out through the annulus between the outer casing wall and the formation face of the wellbore. The cement slurry then cures in the annular space, thereby forming a sheath of hardened cement that, inter alia, supports and positions the casing in the wellbore and bonds the exterior surface of the casing to the subterranean formation.

The subterranean formation may thereafter be stimulated for the production of oil through the cemented wellbore. In some operations, the subterranean formation may be stimulated by a hydraulic fracturing treatment. In hydraulic fracturing treatments, a treatment fluid is pumped past the cement sheath into a portion of the subterranean formation at a rate and pressure such that the subterranean formation breaks down, and one or more fractures are formed. Typically, particulate solids, such as graded sand, are suspended in a portion of the treatment fluid and then deposited into the fractures. These particulate solids, or "proppant particulates," serve to prop open the fracture (e.g., keep the fracture from fully closing) after the hydraulic pressure is removed. By keeping the fracture from fully closing, the proppant particulates aid in forming conductive paths through which produced fluids, such as oil, may flow.

During oil production from a subterranean formation, water or undesirable gas may seep from the formation and accompany the produced oil. The production of water or unwanted gas with the produced oil may present major problems, including a significant reduction of oil production, the need for costly remedial actions, downtime in production, and the like. The water may seep into the well with produced oil from any subterranean zone in communication with the oil producing formation, such as, for example, through a fracture, a high-permeability streak, a high-permeability zone, and the like, or may be the result of water coning, water cresting, lateral channeling, and the like. Additionally, the source of the water may be from waterflood techniques. Likewise, although in some instances gas may be desirably produced from a subterranean formation, certain gases may be undesirable and production at high gas/oil ratios may decrease the productive life of the subterranean formation. Unwanted gas may seep into the well with produced oil due to a variety of causes, including fractures in the formation, gas coning, gas channeling, and the like as a result of the high mobility of gas in the formation.

Conformance control treatments may be used to reduce the influx of water ("water shutoff") or gas ("gas shutoff") with produced oil. As used herein, the term "conformance control" and any variants thereof (e.g., "conformance treatments" or "conformance control treatments") refers to sealant treatments involving the placement of a material, or a "conformance material" or "conformance composition," into a wellbore and adjacent to a water-bearing or gas-bearing portion of a subterranean formation that is capable of at least partially preventing, reducing, or otherwise controlling the influx of the water or gas into the wellbore. Such conformance materials may include, but are not limited to, particulates, gels, sealants, blocking polymers, and the like. Conformance control treatments may enhance recovery efficiency and reduce costly downtime or separation techniques required for separating the oil from unwanted produced fluids.

Subterranean formations often require conformance treatments at depleted or low pressure zones, where the hydrostatic pressure coupled with pumping pressure in the wellbore may exceed the fracture gradient of the formation, thus promoting the formation of unplanned, induced fractures and significant loss of drilling or other treatment fluids, particularly those having high densities. Conformance fluids may additionally be lost into these fractures or other areas of high permeability if they are themselves high-density fluids or are delivered in high-density fluids. Conformance fluids foamed due to the presence of gas within the fluid have thus been used to achieve reduced densities. The addition of gas to achieve foamed conformance materials may not always be sufficient to overcome the high density constituents often included in conformance fluids. Moreover, the presence of the gas and the high density constituents together may cause the foamed conformance fluids to reach extreme viscosities that are unmanageable in terms of mixing and pumping. Furthermore, the equipment requirements for transporting and injecting gases into fluids makes the technology less accessible. Thus, although the density of the conformance fluid may be reduced, it may not be practicably used.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the reduced density sealant compositions of the embodiments described herein to a downhole location.

DETAILED DESCRIPTION

The embodiments herein relate to sealant compositions for use in subterranean formation operations. In some embodiments, the sealant compositions are low-density and capable of preventing or reducing the flow of water and/or gas through a subterranean formation with produced oil. The sealant compositions described in some embodiments herein may have a base sealant composition into which one or more particulate density reducing agents may be included so as to reduce the density of the sealant composition and form a reduced density sealant composition.

Although some embodiments described herein are illustrated by reference to conformance treatments, the reduced density sealant compositions disclosed herein may be used in any subterranean formation operation that may benefit from a sealant. Such treatment operations that may employ the reduced density sealant compositions described herein may include, but are not limited to, an enhanced recovery operation; a steam assisted gravity drainage operation; a leakoff control operation; a drilling operation; a stimulation operation; an acidizing operation; an acid-fracturing operation; a sand control operation; a completion operation; a scale inhibiting operation; a clay stabilizer operation; a fracturing operation; a frac-packing operation; a gravel packing operation; a wellbore strengthening operation; a sag control operation; and any combination thereof.

Moreover, the reduced density sealant compositions described herein may be used in any non-subterranean operation that may benefit from their sealing properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, a method of sealing a portion of a subterranean formation using a reduced density sealant composition is provided.

In some embodiments, a sealant composition is provided comprising an aqueous base fluid, a crosslinkable polymer composition comprising a crosslinkable organic polymer and a crosslinker, and a density segregation prevention agent. In some embodiments, the sealant composition may further comprise a gas. A particulate density reducing agent is introduced into the sealant composition, wherein the particulate density reducing agent is capable of reducing the density of the sealant composition as compared to the density of the sealant composition without the particulate density reducing agent, thereby forming a reduced density sealant composition. The reduced density sealant composition is then introduced into a subterranean formation and allowed to crosslink into a gel to form a seal therein.

As used herein, the term "reduced density sealant composition" refers to a composition having a density in the range of a lower limit of about 0.2 g/cc (1.67 pounds per gallon ("ppg")), 0.3 g/cc, 0.4 g/cc, 0.5 g/cc, 0.6 g/cc, 0.7 g/cc, and 0.8 g/cc to an upper limit of about 1.5 g/cc (12.5 ppg), 1.4 g/cc, 1.3 g/cc, 1.2 g/cc, 1.1 g/cc, 1 g/cc, 0.9 g/cc, and 0.8 g/cc. The reduced density sealant compositions may be defined as sealant compositions in which the density of the sealant composition may be lowered by the addition of density reducing agents other than water (e.g., by dilution). That is, the density of the reduced density sealant composition is lower than the density of the sealant composition comprising only the amount of aqueous base fluid required as a carrier fluid. The aqueous base fluid may not be adjusted to affect density because additional water beyond that required as a carrier fluid may adversely affect the strength of the crosslinked reduced density sealant composition, as well as gelation times. The reduced density sealant compositions described herein may be crosslinked and used in conformance control treatments to maintain the hydrostatic pressure in a treated zone in a subterranean formation below the fracture-gradient of the formation.

The aqueous base fluid for use in the embodiments described herein may be any aqueous base fluid suitable for use in a subterranean formation, provided that it does not adversely interfere with the sealant compositions or the formation of the reduced density sealant compositions. Suitable aqueous based fluids for use in any of these fluids may include, but are not limited to, fresh water; saltwater (e.g., water containing one or more salts dissolved therein); brine (e.g., saturated salt water); seawater; formation water; produced water; and any combination thereof. Generally, the aqueous base fluid may be from any source, provided that it does not contain components that may adversely interfere with the sealant compositions or the reduced density sealant compositions described herein. Brines for use as the aqueous base fluid may be formulated or manufactured by dissolving one or more soluble salts in fresh water, a natural brine, or seawater. Representative soluble salts may include, but are not limited to, chloride; bromide; acetate; a formate salt of potassium; a formate salt of sodium; a formate salt of calcium; a formate salt of magnesium; a formate salt of zinc; and any combination thereof. In some embodiments, the aqueous base fluid may be present in the sealant compositions described herein in an amount in the range of from a lower limit of about 25%, 27.5%, 30%, 32.5%, 35%, 37.5%, 40%, 42.5%, 45%, 47.5%, 50%, 52.5%, 55%, 57.5%, 60%, 62.5%, and 65% to an upper limit of about 99.5%, 97%, 94.5%, 92%, 89.5%, 87%, 84.5%, 82%, 79.5%, 77%, 74.5%, 72%, 69.5%, 67%, 64.5%, 62%, and 59.5% by volume of the sealant composition.

The crosslinkable polymer composition for use in the sealant compositions forming the reduced density sealant compositions described in some embodiments herein comprises a crosslinkable organic polymer and a crosslinker. In some embodiments, the crosslinkable organic polymer and the crosslinker are water-soluble. In some embodiments, the crosslinkable organic polymer may comprise an acrylamide-based polymer; any copolymer thereof; and any combination thereof. Suitable examples of crosslinkable organic polymers for use in the sealant compositions described herein many include, but are not limited to, a polyacrylamide; an acrylamide copolymer; an acrylamide-co-t-butylacrylate copolymer; a 2-acrylamido-2-methylpropane sulfonic acid/acrylamide copolymer; a sulfonated styrene/maleic anhydride copolymer; a vinylpyrrolidone/2-acrylamido-2-methylpropane sulfonic acid/acrylamide terpolymer; a 2-acrylamido-2-methylpropane sulfonic acid/N—N-dimethylacrylamide/acrylamide terpolymer; a polyketone; any derivative thereof; and any combination thereof.

In general, the greater number of monomers in the crosslinking organic polymer that are minimally reactive, the greater the temperature at which gelation may occur and the greater the time lapse before gelation begins. Thus, a crosslinkable organic polymer having a large number of minimally reactive monomers may be used in high temperature formations and may enable increased pumping time such as, for example, in treating particularly deep or long subterranean formation wells.

In some embodiments, the crosslinkable organic polymer may be present in the sealant compositions described herein in an amount in the range of from a lower limit of about 0.1%, 0.5%, 1%, 1.5%, 2%, 2.5%, 3%, 3.5%, 4%, 4.5%, 5%, 5.5%, 6%, 6.5%, 7%, 7.5%, and 8% and 10% to an upper limit of about 16%, 15.5%, 15%, 14.5%, 14%, 13.5%, 13%, 12.5%, 12%, 11.5%, 11%, 10.5%, 10%, 9.5%, 9%, 8.5%, and 8% by weight of the sealant composition. In other embodiments, the crosslinkable organic polymer may be present in the sealant composition described herein in an amount in the range of from about 0.5% to about 12% by weight of the sealant composition. The crosslinker for use in the crosslinkable polymer compositions described herein may be any crosslinker capable of undergoing a crosslinking reaction with the crosslinkable organic polymer of the embodiments herein. Under certain conditions (e.g., temperature, time, and the like), the crosslinker may react with one or more suitable crosslinkable organic polymers included in the crosslinkable polymer composition so as to form a gel. In some embodiments, the crosslinker may be an organic polymer. In some embodiments, the crosslinker may comprise an amine-containing polymer; any copolymer thereof; and any combination thereof. Suitable examples of crosslinkers for use in the embodiments described herein may include, but are not limited to, a polyalkyleneimine (e.g., polyethyleneimine); a polyalkylenepolyamine; a polyfunctional aliphatic amine; a chitosan; a polylysine; a vinyl alcohol/vinylamine copolymer; any derivative thereof; and any combination thereof. In some embodiments, the crosslinker may be a polyvalent metal ion. Suitable examples of polyvalent metal ions for use in the embodiments described herein may include, but are not limited to $Ca^{2+}$; $Cr^{3+}$; $Al^{3+}$; $Fe^{3+}$; $Ti^{4+}$; $Zr^{4+}$; and any combination thereof. In some embodiments, the polyvalent metal ion crosslinker may be pre-complexed with a ligand including, but not limited to, a carboxylate salt (e.g., salts of a monocarboxylic acid, a dicarboxylic acid, and a hydroxyl carboxylic acid); an aminoalcohol; an oligomeric polyamine; a monomeric polyamine; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

In some embodiments, the crosslinker may be present in the crosslinkable polymer compositions described herein in an amount in the range of from a lower limit of about 0.05%, 0.1%, 0.5%, 1%, 1.5%, 2%, 2.5%, 3%, 3.5%, 4%, 4.5%, 5%, 5.5%, 6%, 6.5%, 7%, 7.5%, to an upper limit of about 15%, 14.5%, 14%, 13.5%, 13%, 12.5%, 12%, 11.5%, 11%, 10.5%, 10%, 9.5%, 9%, 8.5%, 8%, and 7.5% by weight of the crosslinkable polymer composition. In other embodiments, the crosslinker may be present in the crosslinkable polymer compositions described herein in an amount in the range of from about 0.5% to about 5% by weight of the crosslinkable polymer composition.

To modify the time lapse (also referred to as "gel time," "gelation," or "crosslinking time") required for the reduced density sealant composition to crosslink to form a gel, or to modify other properties that control gelation (e.g., gelation temperature), or to control the strength of the crosslinked reduced density sealant composition, the weight ratio of the crosslinkable organic polymer to the crosslinker in the crosslinkable polymer composition may be varied. In some embodiments, the weight ratio of the crosslinkable organic polymer to the crosslinker may be in the range of from an upper limit of about 400:1, 380:1, 360:1, 340:1, 320:1, 300:1, 280:1, 260:1, 240:1, 220:1, and 200:1, to a lower limit of about 1.1:1, 2:1, 10:1, 20:1, 40:1, 60:1, 80:1, 100:1, 120:1, 140:1, 160:1, 180:1, and 200:1. In other embodiments, the weight ratio of the crosslinkable organic polymer to the crosslinker may be in the range of from about 50:1 to about 1.1:1.

In some embodiments, the crosslinkable polymer compositions described herein may further comprise a gelation retarder. The gelation retarder may act, among other things, to retard the crosslinking reaction between the crosslinkable organic polymer and the crosslinker. That is, the gelation retarder may be included in the crosslinkable polymer compositions to reduce the time lapse before gelation begins. Retarding the crosslinking reaction may be desirable in some applications to, for example, permit increased pumping time to place the reduced density sealant compositions at a desired location in a subterranean formation. In some embodiments, the crosslinking reaction may occur to form a gel and seal the subterranean formation in a time period ranging from a lower limit of about 2 hours, 6.7 hours, 11.4 hours, 16.1 hours, 20.8 hours, 25.5 hours, 30.2 hours, 34.9 hours, 39.6 hours, 44.3 hours, and 49 hours to an upper limit of about 96 hours, 91.3 hours, 86.6 hours, 81.9 hours, 77.2 hours, 72.5 hours, 67.8 hours, 63.1 hours, 58.4 hours, 53.7, 49 hours.

Additionally, the gelation retarder may permit the crosslinkable polymer compositions to be used at higher temperatures than without the inclusion of the gelation retarder in the crosslinkable polymer compositions. Such may be desirable when working with a particularly high temperature subterranean formation, for example. In some embodiments, the crosslinkable polymer compositions may undergo the crosslinking reaction at temperatures in the range of from a lower limit of about 121° C. (250° F.), 124° C. (255° F.), 127° C. (260° F.), 129° C. (265° F.), 132° C. (270° F.), 135° C. (275° F.), 138° C. (280° F.), 141° C. (285° F.), 143° C. (290° F.), 146° C. (295° F.), and 149° C. (300° F.) to an upper limit of about 177° C. (350° F.), 174° C. (345° F.), 171° C. (340° F.), 168° C. (335° F.), 166° C. (330° F.), 163° C. (325° F.), 160° C. (320° F.), 157° C. (315° F.), 154° C. (310° F.), 152° C. (305° F.), and 149° C. (300° F.).

In some embodiments, the gelation retarder may be a carbonate salt of an alkali metal. Suitable gelation retarders for use in the crosslinkable polymer compositions described herein may include, but are not limited to, sodium carbonate; sodium bicarbonate; lithium carbonate; lithium bicarbonate; potassium carbonate; potassium bicarbonate; ammonium carbonate; ammonium bicarbonate; and any combination thereof. The gelation retarder may be present in the crosslinkable polymer composition in any amount sufficient to retard the crosslinking reaction between the crosslinkable organic polymer and the crosslinker to a desired degree. In some embodiments, the gelation retarder may be present in the crosslinkable polymer compositions in an amount in the range of a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, and 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by volume of the crosslinkable polymer composition. In other embodiments, the gelation retarder may be present in the crosslinkable polymer compositions in an amount in the range of from about 0.5% to about 5% by volume of the crosslinkable polymer composition.

The sealant compositions forming the reduced density sealant compositions described herein further comprise a density segregation prevention agent. As used herein, the term "density segregation prevention agent" refers to any substance capable of preventing or reducing settling or segregation of the individual constituents or phases (e.g., fluids, particulates, and the like) within the reduced density sealant compositions. In some embodiments, the density segregation prevention agent for use in the sealant compositions forming the reduced density sealant compositions may be a biopolymer selected from the group consisting of a gum; a polysaccharide; and any combination thereof. Suitable biopolymers may include, but are not limit to, an alginic acid; a beta-glucan; a carrageenan; a chicle gum; a dammar gum; a gellan gum; a welan gum; a guar gum; a gum arabic; a gum ghatti; a gum tragacanth; a karaya gum; a locust bean gum; a mastic gum; a *psyllium* seed husk; a sodium alginate; a spruce gum; a tara gum; a xanthan gum; a hydroxypropyl guar; a carboxymethyl hydroxypropyl guar; a diutan; a scleroglucan; a cellulose; a derivatized cellulose; a hydroxyethyl cellulose; a hydroxypropyl cellulose; a carboxymethyl cellulose; a carboxymethylhydroxyethyl cellulose; and any combination thereof. In some embodiments, the density segregation prevention agent for use in the sealant compositions forming the reduced density sealant compositions described herein may be a natural or synthetic clay capable of viscosifying the aqueous base fluid. Suitable examples of clays may include, but are not limited to, a smectite clay (e.g., montmorillonite, or bentonite); fuller's earth; saponite; natural hectorite; synthetic hectorite (e.g., laponite); and any combination thereof.

In some embodiments, the density segregation prevention agent may be present in the sealant compositions in an amount in the range of a lower limit of about 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2%, 3.1%, 3%, 2.9%, 2.8%, 2.7%, 2.6%, and 2.5% by weight of the sealant composition.

In some embodiments, the reduced density sealant compositions comprise a sealant composition into which a particulate density reducing agent is added, such that the particulate density reducing agent causes the sealant composition to adopt a reduced density as compared to the sealant composition without the particulate density reducing agent, thereby creating the reduced density sealant compositions described herein. As used herein, the term "particulate density reducing agent" refers to any substance capable of reducing the density of the sealant compositions described herein lacking the particulate density reducing agent. In some embodiments, the particulate density reducing agent may cause the sealant composition to adopt a reduced density as compared to the sealant composition without the particulate density reducing agent, thereby creating a reduced density sealant composition, in the range of a lower limit of about 1%, 5%, 10%, 15%, 20%, 25%, 30%, 35%, 40%, 45%, and 50% to an upper limit of about 90%, 85%, 80%, 75%, 70%, 65%, 60%, 55%, and 50%. In some embodiments, the particulate density reducing agent may cause the sealant composition to adopt a reduced density as compared to the sealant composition without the particulate density reducing agent, thereby creating a reduced density sealant composition, in the range of about 5% to about 80%. In some embodiments, the particulate density reducing agents may permit a reduced amount of density segregation prevention agent to be included in the reduced density sealant compositions. Suitable particulate density reducing agents may include, but are not limited to, a deformable low-density particulate; a non-deformable low-density particulate; and any combination thereof. The particulate density reducing agents may be selected such that they have a lower density or are capable of imparting a lower density (e.g., by the introduction of a gas) compared to that of the sealant composition without the particulate density reducing agent. In some embodiments, the particulate density reducing agents may have a specific gravity in the range of a lower limit of about 0.2, 0.3, 0.4, 0.5, 0.6, 0.7, and 0.8 to an upper limit of about 1.4, 1.3, 1.2, 1.1, 1, 0.9, and 0.8.

The particulate density reducing agents described in some embodiments herein may be deformable low-density particulates. The deformable low-density particulates for use as particulate density reducing agents may reduce the density of the reduced density sealant composition while sustaining imposed stresses due to imposed pressure changes, for example, within a subterranean formation. Suitable deformable low-density particulates for use as the particulate density reducing agents described herein may include, but are not limited to, a hollow elastomer; a solid elastomer; an elastomer encapsulating a droplet of a volatile organic fluid; and any combination thereof. As used herein, the term "fluid" encompasses both liquid phase and gas phase matter. The elastomers forming the deformable low-density particulates may be any elastomer that provides the ability to deform upon encountering certain stresses, such as shear, while behaving as a particulate density reducing agent (e.g., those elastomers having a lower density than the sealant composition into which they are included to form the reduced density sealant compositions described herein). Suitable elastomers may include, but are not limited to, an ethylene-propylene rubber; an ethylene-propylene-diene rubber; a styrene-butadiene copolymer; an acrylonitrile-butadiene-styrene rubber; a vinylidenefluoride homopolymer; a vinylidenedichloride polymer; a vinylidenedichloride copolymer; and any combination thereof. In those embodiments where the particulate density reducing agent is an elastomer encapsulating a droplet of a volatile organic fluid, any volatile organic fluid that is compatible with the elastomer may be used in the embodiments included herein. Examples of suitable volatile organic fluids may include, but are not limited to, hexane; iso-pentane; n-pentane; iso-butane; n-butane; propane; hydrochlorofluorocarbon dimethyl ether; diethyl ether; and any combination thereof. Other volatile organic fluids known in the art may also be used in the elastomer encapsulating a droplet of a volatile organic fluid for use in the method described herein.

The particulate density reducing agents described herein may in some embodiments be non-deformable low-density particulates. The non-deformable low-density particulates may include, but are not limited to, a hollow glass particulate; a hollow fly ash particulate; a solid fly ash particulate;

a hollow polypropylene particulate; a solid polypropylene particulate; a hollow polyethylene particulate; a solid polyethylene particulate; a hollow polystyrene particulate; a solid polystyrene particulate; a hollow polyacrylate particulate; a solid polyacrylate particulate; and any combination thereof.

The deformable and non-deformable low-density particulates described herein for use as the particulate density reducing agent may be any shape and size suitable for use in a subterranean operation. In some embodiments, the deformable and non-deformable low-density particulates are substantially spherical (e.g., a hollow glass bead), having a mean particle size distribution in the range of from a lower limit of about 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, and 100 µm to an upper limit of about 200 µm, 195 µm, 190 µm, 185 µm, 180 µm, 175 µm, 170 µm, 165 µm, 160 µm, 155 µm, 150 µm, 145 µm, 140 µm, 135 µm, 130 µm, 125 µm, 120 µm, 115 µm, 110 µm, 105 µm, and 100 µm. It may be particularly beneficial, although not necessary, that the deformable or non-deformable low-density particulates are substantially spherical when they are hollow. The deformable and non-deformable low-density particulates for use as the particulate density reducing agents may comprise a wide or broad particle distribution size.

In some embodiments, the deformable and non-deformable low-density particulates may be substantially non-spherical, such that they may be, but are not limited to, cubic-shaped, rectangular-shaped, rod-shaped, ellipse-shaped, cone-shaped, pyramid-shaped, or cylinder-shaped. That is, in those embodiments where the deformable or non-deformable low-density particulates are non-spherical, they may have an aspect ratio that may range such that the material is fibrous to such that it is cubic, octagonal, or any other configuration. In some embodiments, the substantially non-spherical deformable or non-deformable low-density particulates may be sized such that the longest axis is in the range of from a lower limit of about 0.01 cm, 0.05 cm, 0.15 cm, 0.2 cm, 0.25 cm, 0.3 cm, 0.35 cm, 0.4 cm, 0.45 cm, and 0.5 cm to an upper limit of about 1 cm, 0.95 cm, 0.9 cm, 0.85 cm, 0.8 cm, 0.75 cm, 0.7 cm, 0.65 cm, 0.6 cm, 0.55 cm, and 0.5 cm and the shortest axis may be sized in the range of from about 0.001 cm, 0.005 cm, 0.01 cm, 0.02 cm, 0.025 cm to an upper limit of about 0.05 cm, 0.045 cm, 0.04 cm, 0.035 cm, 0.03 cm, and 0.025 cm. In some embodiments, the aspect ratio (length/width) of the substantially non-spherical deformable or non-deformable low-density particulates may be in the range of from a lower limit of about 20, 100, 200, 300, 400, 500, 600, 700, 800, 900, and 1000 to an upper limit of about 2000, 1900, 1800, 1700, 1600, 1500, 1400, 1300, 1200, 1100, and 1000.

The deformable and non-deformable low-density particulates for use as the particulate density reducing agent in some embodiments described herein may be included in the sealant composition so as to form the reduced density sealant compositions in an amount in the range of from a lower limit of about 5%, 10%, 15%, 20%, 25%, 30%, 35%, 40%, 45%, and 50% to an upper limit of about 90%, 85%, 80%, 75%, 70%, 65%, 60%, 55%, and 50% by weight of the sealant composition.

In some embodiments, the sealant compositions may further comprise a gas, so as to form a reduced density sealant that is foamed. The gas may provide a compressible or expandable quality to the final reduced density sealant compositions and synergistically operate with the particulate density reducing agents to reduce the density of the sealant composition. As used herein, the term "foam" refers to a two-phase composition having a continuous liquid or solid phase and a discontinuous gas phase. Suitable gases that may be included in the sealant compositions described herein may include, but are not limited to nitrogen; carbon dioxide; air; methane; helium; argon; and any combination thereof. Such gases may be included in the sealant compositions by any method known to one of skill in the art including, agitation (e.g., blending) of the sealant composition so as to incorporate air; direct pumping of a gas into the sealant composition; inclusion of a material or substance that produces the gas; or any combination thereof. In some embodiments, the gas is included in the sealant composition so as to achieve a foam quality (i.e., % gas by volume of the total composition) of the reduced density sealant composition in the range of a lower limit of about 5%, 10%, 15%, 20%, 25%, 30%, 35%, 40%, 45%, and 50% to an upper limit of about 95%, 90%, 85%, 80%, 75%, 70%, 65%, 60%, 55%, and 50%. The foam quality range may represent the foam quality of the density reducing sealant composition either downhole or at the surface of a well site, prior to introducing the reduced density sealant composition into the subterranean formation. In some embodiments, the foam quality of the reduced density sealant composition is in the range of about 50% to about 95% at the well site. The foam quality may be determined by any method known by those of skill in the art, such as by determining the change in volume of the sealant composition upon addition of the gas or by determining the specific gravity of the sealant composition before and after addition of the gas.

In some embodiments, where the sealant composition comprises a gas, the sealant composition may further comprise a stabilizer selected from the group consisting of a foaming surfactant; a hydrophobically modified water-soluble polymer; and any combination thereof. The stabilizer may act to prevent or reduce the break out of the gas from the foamed reduced density sealant composition (i.e., reduce or prevent the foamed reduced density sealant composition from becoming de-foamed by breakdown of the foam bubbles).

Suitable foaming surfactants for use as stabilizers in the reduced density sealant compositions disclosed herein may include, but are not limited to, a nonionic surfactant; an anionic surfactant; a cationic surfactant; an amphoteric surfactant; a zwitterionic surfactant; and any combination thereof. Nonlimiting examples of suitable foaming surfactants may include, but are not limited to, a betaine; a cocoamidopropyl betaine; a sulfobetaine; an alkyl amidopropyl betaine; an alkene amidopropyl betaine; a sulfated alkoxylate; a sulfonated alkoxylate; an alkyl quarternary amine; an alkoxylated linear alcohol; an alkyl sulfonate; an alkyl aryl sulfonate; a $C_{10}$-$C_{20}$ alkyldiphenyl ether sulfonate; a polyethylene glycol; an ether of alkylated phenol; an ethoxylated phenol; a substituted ethoxylated phenol; a sodium dodecylsulfate; an alpha olefin sulfonate (e.g., sodium dodecane sulfonate); an ethoxylated iso-dodecyl alcohol ether sulfate; an ethoxylated alcohol ether sulfate; a trimethyl hexadecyl ammonium bromide; any derivative thereof; or any combination thereof. In some embodiments, the foaming surfactants may be included in sealant compositions in a range from a lower limit of about 0.05%, 0.1%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, and 6% to an upper limit of about 12%, 11.75%, 11.5%, 11.25%, 11%, 10.75%, 10.5%, 10.25%, 10%, 9.75%, 9.5%, 9.25%, 9%, 8.75%, 8.5%, 8.25%, 8%, 7.75%, 7.5%, 7.25%, 7%, 6.75%, 6.5%, 6.25%, and 6% by volume of the sealant composition.

In some embodiments, the stabilizer may be a hydrophobically modified water-soluble polymer. The hydrophobically modified water-soluble polymer may migrate to the air/water interface of foamed reduced density sealant compositions described herein and stabilize the foam. The hydrophobically modified water-soluble polymer may additionally stabilize the reduced density sealant compositions at high temperatures, such as those approaching about 177° C. (350° F.). Moreover, their polymeric nature and high molecular weight may increase the lamellar thickness and viscosity of the film surrounding individual foam bubbles.

The hydrophobically modified water-soluble polymers for use as stabilizers in the reduced density sealant compositions described herein may generally not be crosslinked. However, in some embodiments, crosslinking may be permitted, such as after placement of the composition into the formation. As used herein, the term "hydrophobically modified" refers to a monomer or polymer having hydrophobic compound(s) of carbon length of about $C_1$-$C_{22}$ chemically attached thereto. The hydrophobically modified water-soluble polymer may be cationic; anionic; nonionic; and any combination thereof. In some embodiments, the hydrophobically modified water-soluble polymers may have molecular weights in the range of from a lower limit of about 500,000, 975,000, 1,450,000, 1,925,000, 2,400,000, 2,875,000, 3,350,000, 3,825,000, 4,300,000, and 4,775,000 to an upper limit of about 10,000,000, 9,525,000, 9,050,000, 8,575,000, 8,100,000, 7,625,000, 7,150,000, 6,675,000, 6,200,000, 5,725,000, 5,250,000, and 4,775,000, and any value therebetween. In some embodiments, the hydrophobically modified water-soluble polymers may have molecular weights in the range of from about 1,000,000 to about 8,000,000. The hydrophobically modified water-soluble polymers may be synthesized by any method known to those having ordinary skill in the art, such as by a polymerization reaction.

In some embodiments, the hydrophobically modified water-soluble polymer may be synthesized by hydrophobic modification of a hydrophilic polymer. Suitable hydrophilic polymers may include, but are not limited to, a polyacrylamide; a poly(methacrylamide); a polyvinylamine; a poly(vinyl alcohol); polyvinyl acetate; a polyacrylate; a polyethylene oxide; a polyethylene oxide methyl ether; a polyethylene glycol; a cellulose; a chitostan; a polyamide; a polyetheramine; a polyethyleneimine; a polyhydroxyetheramine; a polylysine; a polysulfone; a starch; a gum; a poly(itaconic acid); a poly((E)-but-2-enoic acid); a poly(acrylic acid); a poly(malonic acid); a poly(methacrylic acid); a poly(maleic acid); a poly(maleic anhydride); a poly(citraconic anhydride); a poly(2-acrylamidomethylpropanesulfonic acid); a poly(1-allyloxy-2-hydroxypropyl sulfonic acid); a poly(vinyl pyrrolidone); a poly(N-vinyl formamide); a poly(diallyldimethylammonium sulfate); a poly(methacrylamidopropyltrimethylammonium chloride); a poly(methacryloylethyltrimethylamine); a poly(dimethylaminopropyl methacrylamide); a poly(2-methacryloxyethyltrimethylammonium chloride); poly(hydroxyethyl acetate); a poly(vinylsulfonic acid); poly(vinylphosphonic acid); a poly(N-vinyl caprolactam); a poly(N-vinylformamide); a polymer of N,N-diallylacetamide; a poly(dimethyl-diallyl-ammonium halide); a poly(styrene sulfonic acid); a polymer of methacrylamidoethyltrimethyl ammonium halide; a poly(N,N-dimethylacrylamide); a poly(dimethylaminoethyl methacrylate); any derivative thereof; any copolymer thereof; any terpolymer thereof; and any combination thereof.

Specific hydrophilic polymers for use in the hydrophobically modified water-soluble polymers may include, but are not limited to, a poly(dimethylaminomethacrylate); a poly(acrylamide/dimethylaminoethyl methacrylate); a poly(methacrylic acid/dimethylaminoethyl methacrylate; a poly(2-acrylamido-2-methyl propane sulfonic acid/dimentylaminoethyl methacrylate); a poly(acrylamide/dimethylaminopropyl methacrylamide); a poly(acrylic acid/dimethylaminopropyl methacrylamide); a poly(methacrylic acid/dimethylaminopropyl methacrylamide); a hydroxyethyl cellulose; any copolymer thereof; any terpolymer thereof; and any combination thereof.

In some embodiments, the hydrophobically modified water-soluble polymers may be synthesized by a reaction of hydrophilic monomer(s) capable of forming any of the hydrophilic polymers, followed by hydrophobic modification of the hydrophilic polymer. In other embodiments, the hydrophobically modified water-soluble polymers may be formed by a reaction comprising a hydrophilic monomer(s) and a hydrophobically modified hydrophilic monomer(s). The hydrophilic monomer(s) for use in any capacity, including as hydrophilic monomer(s) or as hydrophobically modified hydrophilic monomer(s), may be any monomer capable of forming any hydrophilic polymer that is capable of hydrophobic modification either in its monomer form (as is the case with the hydrophobically modified hydrophilic monomer) or after reacting to form a hydrophilic polymer to become a hydrophobically modified water-soluble polymer. Suitable hydrophilic monomers, for example, for use in any capacity disclosed herein may be any monomer capable of forming the hydrophilic polymers described herein. Examples of suitable hydrophilic monomers include, but are not limited to, acrylamide; methacrylamide; cellulose; vinylamine; vinyl alcohol; vinyl acetate; alkyl acrylate; an acrylate salt of alkali earth metal; an acrylate salt of alkaline earth methal; ethylene oxide; ethyleneimine; lysine; a sulfone; acrylic acid; methacrylic acid; an alkali earth metal salt of methacrylic acid; an alkaline earth metal salt of methacrylic acid; 2-acrylamido-2-methyl propane sulfonic acid; an alkali earth metal salt of 2-acrylamido-2-methyl propane sulfonic acid; an alkaline earth metal salt of 2-acrylamido-2-methyl propane sulfonic acid; N,N-dimethylacrylamide; vinyl pyrrolidone; dimethylaminoethyl methacrylate; dimethylaminopropylmethacrylamide; trimethylammoniumethyl methacrylate chloride; hydroxyethyl acrylate; vinyl sulfonic acid; an alkali earth metal salt of vinyl sulfonic acid; an alkaline earth metal salt of vinyl sulfonic acid; vinyl phosphonic acid; an alkali earth metal salt of vinyl phosphonic acid; an alkaline earth metal salt of vinyl phosphonic acid; vinyl caprolactam; N-vinylformamide; N,N-diallylacetamide; dimethyl-diallyl-ammonium halide; itaconic acid; styrene sulfonic acid; methacrylamidoethyltrimethyl ammonium halide; (E)-but-2-enoic acid; malonic acid; maleic acid; maleic anhydride; citraconic anhydride; 1-allyloxy-2-hydroxypropyl sulfonic acid; N-vinyl formamide; diallyldimethylammonium chloride; diallyldimethylammonium sulfate; methacrylamidopropyltrimethylammonium chloride; hydroxyethyl acetate; octadecyldimethylammoniumethyl methacrylate bromide; hexadecyldimethylammoniumethyl methacrylate bromide; hexadecyldimethylammoniumpropyl methacrylamide bromide; 2-ethylhexyl methacrylate; hexadecyl methacrylamide; quaternary salt derivatives of acrylamide; quaternary salt derivatives of acrylic acid; and any combination thereof.

In some embodiments, the hydrophilic monomers, hydrophilic polymers, and/or the hydrophobically modified hydrophilic monomers may additionally be hydrophilically modified so as to, for example, introduce or enhance branching, so long as the function of the hydrophobically modified water-soluble polymer is not adversely affected. The hydrophilic modification may occur before or after hydrophobic modification to a hydrophilic monomer or a hydrophilic polymer and may be achieved using one or more hydrophilic groups. Any hydrophilic group capable of introducing or enhancing branching may be used for hydrophilic modification. Suitable hydrophilic groups may include, but are not limited to, a hydroxyl group; a carbonyl group; a carboxyl group; a sulfhydryl group; an amino group; a phosphate group; a polyether group; any derivative thereof; and any combination thereof. Preferably, if a polyether group is used for hydrophilic modification, it also comprises a halogen; sulfonate; sulfate; organic acid; epichlorohydrin-terminated polyethylene oxide methyl ether; or a derivative thereof. Suitable polyether groups include, but are not limited to, polyethylene oxide; polypropylene oxide; polybutylene oxide; copolymers thereof; terpolymers thereof; and any combination thereof.

In some embodiments, the backbone of the hydrophobically modified water-soluble polymer (e.g., the hydrophilic polymer backbone formed before or after hydrophobic modification with hydrophobic compound(s)) may comprise reactive amino groups capable of reacting with hydrophobic groups. Suitable amino groups may include, but are not limited to, a dimethylamino group derived from a dimethylaminoethyl methacrylate; a dimethylaminopropyl methacrylamide; and any combination thereof. In other embodiments, the hydrophobically modified water-soluble polymer backbone may comprise polar heteroatoms including, but not limited to, oxygen; nitrogen; sulfur; phosphorous; and any combination thereof.

The hydrophobic compounds capable of reacting with the hydrophilic polymer or a hydrophilic monomer to form the hydrophobically modified water-soluble polymers of the embodiments described herein may include an alkyl halide; a sulfonate; a sulfate; an organic acid; any derivative thereof; and any combination thereof. Suitable hydrophobic compounds include, but are not limited to, octenyl succinic acid; an anhydride of octenyl succinic acid; an ester of octenyl succinic acid; an imide of octenyl succinic acid; an amide of octenyl succinic acid; dodecenyl succinic acid; an anhydride of dodecenyl succinic acid; an ester of dodecenyl succinic acid; an imide of dodecenyl succinic acid; an amide of dodecenyl succinic acid; vinyl ester; alkyl ester of acrylic acid; alkylaryl alcohol ester of acrylic acid; alkyl ester of methacrylic acid; alkylaryl alcohol ester of methacrylic acid; alkyl halide; butadiene; 1-vinylnaphthalene; and any combination thereof. In certain embodiments, the hydrophobic compound may have an alkyl chain length of from about 1 to about 22 carbons, and any value therebetween. In another embodiment, the hydrophobic group may have an alkyl chain length of from about 7 to about 20 carbons, and any value therebetween. In still other embodiments, the hydrophobic compound may have an alkyl chain length of from about 12 to about 18 carbons, and any value therebetween.

In those embodiments in which the hydrophobically modified water-soluble polymers are formed by first providing a hydrophilic polymer or by providing a hydrophilic polymer after polymerizing hydrophilic monomers, the molar ratio of hydrophilic polymer or hydrophilic monomers to hydrophobic compound(s) is in the range of from about 99.98:0.02 to about 90:10, and any value therebetween. In those embodiments in which the hydrophobically modified water-soluble polymer is formed by a polymerization reaction of a hydrophilic monomer(s) and a hydrophobically modified hydrophilic monomer(s), the molar ratio of the hydrophilic monomer(s) to hydrophobically modified hydrophilic monomer(s) in the hydrophobically modified water-soluble polymer is in the range of from about 99.98:0.02 to about 90:10, and any value therebetween.

Specific hydrophobically modified water-soluble polymers for use as stabilizers in the reduced density sealant compositions described herein may include, but are not limited to, a hydrophobically modified poly(dimethylaminoethylmethacrylate); a hydrophobically modified poly(vinylpyrrolidone-co-dimethylaminoethylmethacrylate); a methyl cellulose; an ethyl cellulose; an ethyl hydroxypropyl cellulose; an ethyl hydroxypropyl cellulose; and any combination thereof.

In some embodiments, the hydrophobically modified water-soluble polymer may be present in the reduced density sealant compositions in an amount in the range of from a lower limit of about 0.05%, 0.3%, 0.55%, 0.8%, 1.05%, 1.3%, 1.55%, 1.8%, 2.05%, 2.3%, and 2.55% to an upper limit of about 5%, 4.75%, 4.5%, 4.25%, 4%, 3.75%, 3.5%, 3.25%, 3%, 2.75%, and 2.5% by weight of the reduced density sealant composition.

Suitable commercially hydrophobically modified water-soluble polymers may include, but are not limited to, HPT-1™, a hydrophobically modified methacrylate, available from Halliburton Energy Services, Inc. in Houston, Tex.; METHOCEL™, a methyl cellulose, available from The Dow Chemical Company in Midland, Mich.; STYLEZE W-20™, a hydrophobically modified methacrylate, available from Ashland Inc. in Covington, Ky.

In various embodiments, systems configured for preparing, transporting, and delivering the reduced density sealant compositions described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a reduced density sealant composition. The pump may be, for example, a high pressure pump or a low pressure pump, which may depend on, inter alia, the viscosity and density of the reduced density sealant composition, the type of the cementing operation, and the like.

In some embodiments, the systems described herein may further comprise a mixing tank arranged upstream of the pump and in which the reduced density sealant composition is formulated. In various embodiments, the pump (e.g., a low pressure pump, a high pressure pump, or a combination thereof) may convey the reduced density sealant composition from the mixing tank or other source of the reduced density sealant composition to the tubular. In other embodiments, however, the reduced density sealant composition can be formulated offsite and transported to a worksite, in which case the reduced density sealant composition may be introduced to the tubular via the pump directly from a transport vehicle or a shipping container (e.g., a truck, a railcar, a barge, or the like) or from a transport pipeline. In yet other embodiments, the reduced density sealant composition may be formulated on the fly at the well site where components of the reduced density sealant composition are pumped from a transport (e.g., a vehicle or pipeline) and mixed during introduction into the tubular. In any case, the reduced density sealant composition may be drawn into the pump, elevated to an appropriate pressure, and then introduced into the tubular for delivery downhole.

FIG. 1 shows an illustrative schematic of a system that can deliver reduced density sealant compositions of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a reduced density sealant composition of the present invention may be formulated. Again, in some embodiments, the mixing tank 10 may represent or otherwise be replaced with a transport vehicle or shipping container configured to deliver or otherwise convey the reduced density sealant composition to the well site. The reduced density sealant composition may be conveyed via line 12 to wellhead 14, where the reduced density sealant composition enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the reduced density sealant composition may subsequently return up the wellbore in the annulus between the tubular 16 and the wellbore 22 as indicated by flow lines 24. In other embodiments, the reduced density sealant composition may be reverse pumped down through the annulus and up tubular 16 back to the surface, without departing from the scope of the disclosure. Pump 20 may be configured to raise the pressure of the reduced density sealant composition to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other subterranean formation operations.

It is also to be recognized that the disclosed reduced density sealant compositions may also directly or indirectly affect the various downhole equipment and tools that may come into contact with them during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a sealant composition comprising an aqueous base fluid, a crosslinkable polymer composition, and a density segregation prevention agent, wherein the crosslinkable polymer composition comprises a crosslinkable organic polymer and a crosslinker; introducing a particulate density reducing agent into the sealant composition, wherein the particulate density reducing agent causes the sealant composition to adopt a reduced density as compared to the sealant composition without the particulate density reducing agent, thereby creating a reduced density sealant composition; introducing the reduced density sealant composition into a subterranean formation; and crosslinking the reduced density sealant composition into a gel to form a seal in the subterranean formation.

B. A method comprising: providing a sealant composition comprising an aqueous base fluid, a crosslinkable polymer composition, a density segregation prevention agent, and a gas, wherein the crosslinkable polymer composition comprises a crosslinkable organic polymer and a crosslinker; introducing a particulate density reducing agent into the sealant composition, wherein the particulate density reducing agent is selected from the group consisting of a deformable low-density particulate; a non-deformable low-density particulate; and any combination thereof, wherein the particulate density reducing agent causes the sealant composition to adopt a reduced density as compared to the sealant composition without the particulate density reducing agent, thereby creating a reduced density sealant composition; introducing the reduced density sealant composition into a subterranean formation; and crosslinking the reduced density sealant composition into a gel to form a seal in the subterranean formation.

Each of embodiments A and B may have one or more of the following additional elements in any combination:

Element 1: Wherein the crosslinkable organic polymer is an acrylamide-based polymer; any copolymer thereof; and any combination thereof.

Element 2: Wherein the crosslinkable organic polymer is selected from the group consisting of a polyacrylamide; an acrylamide copolymer; an acrylamide-co-t-butylacrylate copolymer; a 2-acrylamido-2-methylpropane sulfonic acid/acrylamide copolymer; a sulfonated styrene/maleic anhydride copolymer; a vinylpyrrolidone/2-acrylamido-2-methylpropane sulfonic acid/acrylamide terpolymer; a 2-acrylamido-2-methylpropane sulfonic acid/N—N-dimethylacrylamide/acrylamide terpolymer; a polyketone; any derivative thereof; and any combination thereof.

Element 3: Wherein the crosslinker is an amine-containing polymer; any copolymer thereof; and any combination thereof.

Element 4: Wherein the crosslinker is selected from the group consisting of a polyalkyleneimine; a polyalkylenepolyamine; a polyfunctional aliphatic amine; a chitosan; a polylysine; a vinyl alcohol/vinylamine copolymer; any derivative thereof; and any combination thereof.

Element 5: Wherein the crosslinkable organic polymer and the crosslinker are water-soluble.

Element 6: Wherein the density segregation prevention agent is selected from the group consisting of an alginic acid; a beta-glucan; a carrageenan; a chicle gum; a dammar gum; a gellan gum; a welan gum; a guar gum; a gum arabic; a gum ghatti; a gum tragacanth; a karava gum; a locust bean gum; a mastic gum; a *psyllium* seed husk; a sodium alginate; a spruce gum; a tara gum; a xanthan gum; a hydroxypropyl guar; a carboxymethyl hydroxypropyl guar; a diutan; a scleroglutan; a cellulose; a derivatized cellulose; a hydroxyethyl cellulose; a hydroxypropyl cellulose; a carboxymethyl cellulose; a carboxymethylhydroxyethyl cellulose; a natural clay; a synthetic clay; and any combination thereof.

Element 7: Wherein the particulate density reducing agent is selected from the group consisting of a deformable low-density particulate; a non-deformable low-density particulate; and any combination thereof.

Element 8: Wherein the deformable low-density particulate is selected from the group consisting of a hollow elastomer; a solid elastomer; an elastomer encapsulating a droplet of a volatile organic fluid; and any combination thereof.

Element 9: Wherein the elastomer forming the deformable low-density particulate is selected from the group consisting of an ethylene-propylene rubber; an ethylene-propylene-diene rubber; a styrene-butadiene copolymer; an acrylonitrile-butadiene-styrene rubber; a vinylidenefluoride homopolymer; a vinylidenedichloride polymer; a vinylidenedichloride copolymer; and any combination thereof.

Element 10: Wherein the non-deformable low-density particulate is selected from the group consisting of a hollow glass particulate; a hollow fly ash particulate; a solid fly ash particulate; a hollow polypropylene particulate; a solid polypropylene particulate; a hollow polyethylene particulate; a solid polyethylene particulate; a hollow polystyrene particulate; a solid polystyrene particulate; a hollow polyacrylate particulate; a solid polyacrylate particulate; and any combination thereof.

Element 11: Wherein the sealant composition further comprises a stabilizer selected from the group consisting of a foaming surfactant; a hydrophobically modified water-soluble polymer; and any combination thereof.

Element 12: Wherein the hydrophobically modified water-soluble polymer is formed by hydrophobic modification of a hydrophilic polymer.

Element 13: Wherein the hydrophobically modified water-soluble polymer is formed by a polymerization reaction of a hydrophilic monomer and a hydrophobically modified hydrophilic monomer.

Element 14: Wherein the foaming surfactant is selected from the group consisting of a nonionic surfactant; an anionic surfactant; a cationic surfactant; an amphoteric surfactant; a zwitterionic surfactant; and any combination thereof.

By way of non-limiting example, exemplary combinations applicable to A and B include: A with 1, 4, and 6; A with 7 and 10; B with 5, 8, 9, and 10; and B with 2, 3, and 11.

To facilitate a better understanding of the embodiments herein, the following examples of preferred or representative embodiments are given. In no way should the following examples be read to limit, or to define, the scope of the invention.

Example 1

In this example, the use of a foaming surfactant blend of an anionic surfactant, a betaine, and an amine oxide available from Halliburton Energy Services, Inc. in Houston, Tex. as ZONESEAL® 2000, and a zwitterionic foaming surfactant in stabilizing the foam quality of the sealant compositions described in some embodiments herein, prior to adding the particulate density reducing agent(s), was evaluated. The crosslinkable polymer composition for use in the sealant composition was prepared using 200 gallons/1000 gallons ("gal/Mgal") of an acrylamide-co-t-butylacrylate copolymer (crosslinkable organic polymer) and 75 gal/Mgal of polyethyleneimine (crosslinker) in 7% KCl solution. To the crosslinkable polymer composition, diutan in pounds per 1000 gallons ("lbs/Mgal") (density segregation prevention agent) and either ethoxylated alcohol ether sulfate (nonionic foaming surfactant) or cocoamidopropyl betaine (zwitterionic surfactant) in volume % was added in the amounts in Table 1. Finally, air (gas) was incorporated into the sealant compositions with high shear agitation until the foam quality listed in Table 1 was achieved. The foamed sealant compositions were placed at room temperature ("RT") and at 90.6° C. (195° F.) for 18 hours. Under these conditions, the sealant composition had a gel time of less than 8 hours.

Thereafter, the foam stability of each sample was determined by visual observation. A foamed sealant composition was deemed "stable" if no change in volume occurred and uniform bubble size in the foamed gel was observed. A foamed sealant composition was deemed "unstable" if a gas phase was observed throughout the sealant composition but the bubble size has varied from top to bottom of the crosslinked gel and reduction in volume was observed. A foamed sealant composition was deemed "separated" if two distinct fluid layers were observed (i.e., a liquid bottom phase and a foam top phase).

The results are shown in Table 1 and demonstrate that both the nonionic and the zwitterionic foaming surfactant are effective at stabilizing the foamed sealant compositions at RT, regardless of the concentration of the foaming surfactant or the density segregation prevention agent. However, at higher foam qualities and increased temperature, the zwitterionic surfactant was more effective in stabilizing the foamed sealant compositions.

TABLE 1

| Diutan (lbs/Mgal) | Foaming Surfactant Blend (vol %) | Zwitterionic Foaming Surfactant (vol %) | Foam Quality | Foam Stability @ RT | Foam Stability @ 90.6° C. |
|---|---|---|---|---|---|
| 60 | 1 | — | 20% | Stable | Unstable |
| 60 | 1 | — | 40% | Stable | Unstable |
| 60 | 3 | — | 40% | Stable | Unstable |
| 60 | 5 | — | 40% | Stable | Unstable |
| 75 | 1 | — | 20% | Stable | Stable |
| 75 | 1 | — | 40% | Stable | Unstable |
| 75 | 2 | — | 40% | Stable | Unstable |
| 75 | 5 | — | 40% | Stable | Unstable |
| 75 | 8 | — | 40% | Stable | Unstable |
| 75 | 1 | — | 50% | Stable | Unstable |
| 60 | — | 10 | 40% | Stable | Unstable |
| 100 | — | 3 | 50% | Stable | Stable |
| 100 | — | 5 | 50% | Stable | Stable |
| 100 | — | 3 | 50% | Stable | Stable |
| 100 | — | 5 | 50% | Stable | Stable |

Example 2

In this example, optimization of the amounts of a zwitterionic foaming surfactant and the density segregation prevention agent in stabilizing the foam quality of the sealant compositions described in some embodiments herein, prior to adding the particulate density reducing agent(s) was performed. The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, diutan in lbs/Mgal (density segregation prevention agent) and cocoamidopropyl betaine (zwitterionic surfactant) in volume % was added in the amounts in Table 2. Finally, air (gas) was incorporated into the sealant compositions with high shear agitation until the foam quality listed in Table 2 was achieved. The foamed sealant compositions were placed at RT and at 90.6° C. (195° F.) for 18 hours. Thereafter, the foam stability of each sample was determined by visual observation in accordance with Example 1.

The results are shown in Table 2 and demonstrate that both a reduced concentration of zwitterionic foaming surfactant and a reduced concentration of density segregation prevention agent could yield stable foams, similar to those having a greater concentration of one or both of the two constituents. Additionally, Table 2 shows that a certain concentration of density segregation prevention agent, which may vary depending on the density segregation prevention agent selected, is required to prevent separation of the foamed sealant composition, even at RT.

TABLE 2

| Diutan (lbs/Mgal) | Zwitterionic Foaming Surfactant (vol %) | Foam Quality | Foam Stability @ RT | Foam Stability @ 90.6° C. |
| --- | --- | --- | --- | --- |
| 100 | 1 | 50% | Too viscous to foam | |
| 85 | 3 | 50% | Stable | Stable |
| 85 | 1 | 50% | Stable | Stable |
| 85 | 0.5 | 50% | Stable | Stable |
| 85 | 0.5 | 80% | Stable | Stable |
| 75 | 1 | 50% | Stable | Stable |
| 75 | 0.5 | 50% | Stable | Stable |
| 75 | 0.1 | 50% | Stable | Stable |
| 65 | 1 | 50% | Stable | Stable |
| 65 | 0.5 | 50% | Stable | Stable |
| 55 | 1 | 50% | Stable | Unstable |
| 45 | 1 | 50% | Stable | Unstable |
| 35 | 1 | 50% | Stable | Unstable |
| 25 | 1 | 50% | Stable | Separated |
| 10 | 1 | 50% | Separated | Separated |

Example 3

In this example, the use of three different density segregation prevention agents at preventing or reducing settling or segregation of the individual constituents or phases of the sealant compositions in some embodiments described herein was evaluated. In this example, the effectiveness of the density segregation prevention agent was determined based on measured foam quality. The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, 1% by volume of cocoamidopropyl betaine (zwitterionic surfactant) was added and either scleroglucan, xanthan, or welan gum in lbs/Mgal (density segregation prevention agent) was added in the amounts shown in Table 3. Finally, air (gas) was incorporated into the sealant compositions by high shear agitation until a foam quality of 50% was achieved. The foamed sealant compositions were placed at RT and at 90.6° C. (195° F.) for 18 hours. Thereafter, the foam stability of each sample was determined by visual observation in accordance with Example 1.

The results are shown in Table 3 and demonstrate that among the listed density segregation prevention agents and at the concentrations tested, welan gum was the most effective at maintaining foam stability.

TABLE 3

| Density Segregation Prevention Agent | Density Segregation Prevention Agent (lbs/Mgal) | Foam Stability @ RT | Foam Stability @ 90.6° C. |
| --- | --- | --- | --- |
| Scleroglucan | 65 | Separated | Separated |
| Scleroglucan | 65 | Separated | Separated |
| Xanthan | 65 | Separated | Separated |
| Xanthan | 75 | Separated | Separated |
| Welan Gum | 65 | Stable | Stable |
| Welan Gum | 55 | Stable | Stable |
| Welan Gum | 45 | Stable | Stable |
| Welan Gum | 35 | Stable | Separated |

Example 4

In this example, the ability of welan gum as a density segregation prevention agent for preventing or reducing settling or segregation of the individual constituents or phases of the sealant compositions in some embodiments described herein was evaluated at an elevated temperature. In this example, the effectiveness of the density segregation prevention agent was determined based on measuring foam quality. The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, 1% by volume of cocoamidopropyl betaine (zwitterionic surfactant) was added and 45 lbs/Mgal of welan gum was added. Finally, air (gas) was incorporated into the sealant composition by high shear agitation until a foam quality of 50% was achieved. The foamed sealant composition was placed at 176.7° C. (350° F.) for 18 hours. Thereafter, the foam stability of the sample was determined by visual observation in accordance with Example 1. The results revealed that the sample was unstable, indicating that at least at 35 lbs/Mgal in the sealant composition of this Example, welan gum was not effective.

Example 5

In this example, the ability of a hydrophobically modified water-soluble polymer to stabilize some of the foamed sealant compositions described herein comprising one of three density segregation prevention agents was evaluated. In this example, the effectiveness of the hydrophobically modified water-soluble polymer was determined based on measured foam quality. The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, 1% by volume of cocoamidopropyl betaine (zwitterionic surfactant) was added and either diutan, welan gum, or xanthan in lbs/Mgal (density segregation prevention agent) was added in the amounts in Table 4. For comparison, some sealant compositions included a hydrophobically modified poly(dimethylaminoethylmethacrylate) (referred to herein in short as "HMPDM") in lbs/Mgal (hydrophobically modified water-soluble polymer) in the amounts shown in Table 4 and some sealant compositions were evaluated without the hydrophobically modified water-soluble polymer. The symbol "-" indicates that the particular constituent in Table 4 was not included in the sealant composition. For comparison, a sealant composition was prepared as above without any density segregation prevention agent. Finally, air (gas) was incorporated into the sealant compositions by high shear agitation of each sealant composition until a foam quality of 50% was achieved. The foamed sealant compositions were placed at RT and at 90.6° C. (195° F.) for 18 hours. Thereafter, the foam stability of each sample was determined by visual observation in accordance with Example 1.

The results are shown in Table 4 and demonstrate that the presence of HMPDM alone was not effective at maintaining foam quality. Xanthan was not effective alone or in combination with HMPDM. Both welan gum and diutan were effective alone and in combination with HMPDM at both temperatures. However, at 90.6° C. (195° F.), the presence of HMPDM almost universally enhanced the stability of the sealant composition.

TABLE 4

| Density Segregation Prevention Agent | Density Segregation Prevention Agent (lbs/Mgal) | HMPDM (lbs/Mgal) | Foam Stability @ RT | Foam Stability @ 90.6° C. |
|---|---|---|---|---|
| — | — | 5 | Separated | Separated |
| Diutan | 55 | — | Stable | Unstable |
| Diutan | 55 | 5 | Stable | Stable |
| Diutan | 45 | — | Stable | Unstable |
| Diutan | 45 | 5 | Stable | Stable |
| Diutan | 35 | — | Stable | Unstable |
| Diutan | 35 | 5 | Stable | Stable |
| Diutan | 25 | — | Stable | Separated |
| Diutan | 25 | 5 | Stable | Separated |
| Welan Gum | 45 | — | Stable | Stable |

TABLE 4-continued

| Density Segregation Prevention Agent | Density Segregation Prevention Agent (lbs/Mgal) | HMPDM (lbs/Mgal) | Foam Stability @ RT | Foam Stability @ 90.6° C. |
|---|---|---|---|---|
| Welan Gum | 45 | 5 | Stable | Stable |
| Welan Gum | 35 | — | Stable | Separated |
| Welan Gum | 35 | 5 | Stable | Separated |
| Xanthan | 75 | — | Separated | Separated |
| Xanthan | 75 | 5 | Separated | Separated |

Example 6

In this example, the viscosities of the sealant compositions described herein comprising one of two density segregation prevention agents were evaluated. One control sample was tested that did not comprise a gas (i.e., was not foamed) for comparison. Each sample, including the control samples and the test samples, was prepared identically, except no air was added to the control sample.

The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, 1% by volume of cocoamidopropyl betaine (zwitterionic surfactant) was added and either diutan or welan gum in lbs/Mgal (density segregation prevention agent) was added in the amounts shown in Table 5. Finally, air (gas) was incorporated to the test sealant compositions by high shear agitation of each test sealant composition until a foam quality of 50% was achieved. The viscosities in centipoise (cP) of the control and foamed sealant compositions were evaluated at 1 rpm, 3 rpm, 30, rpm, 60 rpm, 100 rpm, 200 rpm, 300 rpm, and 600 rpm using a Chandler 3500 rheometer and an R1B1 bob. The indicator "OS" refers to "off scale," indicating that the viscosity could not be determined because it was too small to be measured with the instrument used.

The results are shown in Table 5 and indicate that the density segregation prevention agents provide pseudoplastic or shear thinning characteristics to the sealant compositions described herein. Low rheology at high shear rates may enable lower pump pressure, and high rheology numbers at low shear rates (e.g., near static conditions) may indicate suspension stability against settling, density segregation, and/or phase separation of the constituents of the sealant composition. Diutan appeared to provide a more pseudoplastic shear thinning composition than welan gum.

TABLE 5

| Density Segregation Prevention Agent | Density Segregation Prevention Agent (lbs/Mgal) | 1 rpm (cP) | 3 rpm (cP) | 30 rpm (cP) | 60 rpm (cP) | 100 rpm (cP) | 200 rpm (cP) | 300 rpm (cP) | 600 rpm (cP) |
|---|---|---|---|---|---|---|---|---|---|
| Diutan (CONTROL) | 75 | 23000 | 9000 | 950 | 520 | 330 | 168 | 116 | 60 |
| Diutan (TEST) | 75 | 15998 | 5400 | 900 | 620 | 480 | 352 | OS | OS |
| Welan Gum (TEST) | 65 | 11665 | 4600 | 1060 | 700 | 450 | 435 | OS | OS |
| Welan Gum (TEST) | 45 | 5999 | 2700 | 700 | 495 | 396 | 301 | 264 | OS |

Example 7

In this example, the ability of a hydrophobically modified water-soluble polymer to stabilize some of the sealant compositions described herein comprising a welan gum density segregation prevention agent was evaluated at an elevated temperature. In this example, the effectiveness of the hydrophobically modified water-soluble polymer was determined based on measured foam quality. The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, 1% by volume of cocoamidopropyl betaine (zwitterionic surfactant) and 45 lbs/Mgal welan gum (density segregation prevention agent) was added. For comparison, some sealant compositions included 5 lbs/Mgal of HMPDM (hydrophobically modified water-soluble polymer) compared with the corresponding sealant compositions without HMPDM. The symbol "-" indicates that the particular constituent in Table 6 was not included in the sealant composition. For comparison, one sealant composition was prepared as above without any density segregation prevention agent. Finally, air (gas) was incorporated into the sealant compositions by high shear agitation of each sealant composition until a foam quality of 50% was achieved. The foamed sealant compositions were placed at 176.7° C. (350° F.) for 18 hours. Thereafter, the foam stability of each sample was determined by visual observation in accordance with Example 1.

The results shown in Table 6 demonstrate that the presence of HMPDM or the density segregation prevention agent alone was not effective at maintaining foam quality. However, at elevated temperature, the presence of HMPDM enhanced the stability of the sealant composition in combination with welan gum.

TABLE 6

| Density Segregation Prevention Agent | Density Segregation Prevention Agent (lbs/Mgal) | HMPDM (lbs/Mgal) | Foam Stability @ 176.7° C. |
|---|---|---|---|
| — | — | 5 | Separated |
| Welan Gum | 45 | — | Unstable |
| Welan Gum | 45 | 5 | Stable |

Example 8

In this example, the ability of a hydrophobically modified water-soluble polymer to stabilize some of the sealant compositions described herein comprising one of three density segregation prevention agents was evaluated. In this example, the effectiveness of the hydrophobically modified water-soluble polymer was determined based on measured foam quality. The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, 1% by volume of cocoamidopropyl betaine (zwitterionic surfactant) was added and either welan gum or xanthan in lbs/Mgal (density segregation prevention agent) was added in the amounts shown in Table 7. For comparison, some sealant compositions included a hydrophobically modified methyl cellulose (referred to herein in short as "HMMC") in lbs/Mgal (hydrophobically modified water-soluble polymer) in the amounts in Table 7 and some sealant compositions were evaluated without the hydrophobically modified water-soluble polymer. The symbol "-" indicates that the particular constituent shown in Table 7 was not included in the sealant composition. For comparison, two sealant compositions were prepared as above without any density segregation prevention agent. Finally, air (gas) was incorporated into the sealant compositions by high shear agitation of each sealant composition until a foam quality of 50% was achieved. The foamed sealant compositions were placed at RT and at 90.6° C. (195° F.) for 18 hours. Thereafter, the foam stability of each sample was determined by visual observation in accordance with Example 1.

The results are shown in Table 7 and demonstrate that HMMC alone was not effective at maintaining foam quality. Xanthan was not effective alone or in combination with HMMC at either temperature. The presence of HMMC appeared to at least slow the separation of the foamed sealant composition when used in combination with reduced volume of welan gum. In comparison to Example 7, HMPDM appears to be a more effective stabilizing hydrophobically modified water-soluble polymer than HMMC.

TABLE 7

| Density Segregation Prevention Agent | Density Segregation Prevention Agent (lbs/Mgal) | HMMC (lbs/Mgal) | Foam Stability @ RT | Foam Stability @ 90.6° C. |
|---|---|---|---|---|
| — | — | 85 | Separated | Separated |
| — | — | 170 | Separated | Separated |
| Welan Gum | 45 | — | Stable | Stable |
| Welan Gum | 45 | 170 | Stable | Stable |
| Welan Gum | 35 | — | Stable | Separated |
| Welan Gum | 35 | 170 | Stable | Separated (gradual) |
| Xanthan | 75 | — | Separated | Separated |
| Xanthan | 75 | 170 | Separated | Separated |

Example 9

In this example, the ability of a hydrophobically modified water-soluble polymer to stabilize some of the sealant compositions described herein comprising a welan gum density segregation prevention agent was evaluated at an elevated temperature. In this example, the effectiveness of the hydrophobically modified water-soluble polymer was determined based on measured foam quality. The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, 1% by volume of cocoamidopropyl betaine (zwitterionic surfactant) and 45 lbs/Mgal welan gum (density segregation prevention agent) was added. For comparison, some sealant compositions included 5 lbs/Mgal of HMMC (hydrophobically modified water-soluble polymer) and some sealant compositions were evaluated without HMMC. The symbol "-" indicates that the particular constituent in Table 8 was not included in the sealant composition. For comparison, two sealant compositions were prepared as above without any density segregation prevention agent. Finally, air (gas) was incorporated into the sealant compositions by high shear agitation of each sealant composition until a foam quality of 50% was achieved. The foamed sealant compositions were placed at 176.7° C. (350° F.) for 18 hours. Thereafter, the foam stability of each sample was determined by visual observation in accordance with Example 1.

The results are shown in Table 8 and demonstrate that the presence of HMMC alone was not effective at maintaining foam quality. However, at elevated temperature, the presence of HMMC enhanced the stability of the sealant composition in combination with welan gum.

TABLE 8

| Density Segregation Prevention Agent | Density Segregation Prevention Agent (lbs/Mgal) | HMMC (lbs/Mgal) | Foam Stability @ 176.7° C. |
|---|---|---|---|
| — | — | 85 | Separated |
| — | — | 170 | Separated |
| Welan Gum | 45 | — | Unstable |
| Welan Gum | 45 | 170 | Stable |

Example 10

In this example, the ability of a hydrophobically modified water-soluble polymer to stabilize some of the sealant compositions described herein comprising one of three density segregation prevention agents was evaluated. In this example, the effectiveness of the hydrophobically modified water-soluble polymer was determined based on measured foam quality. The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, 1% by volume of cocoamidopropyl betaine (zwitterionic surfactant) and either 45 lbs/Mgal welan gum (density segregation prevention agent) was added. For comparison, one sealant composition included 32 lbs/Mgal of hydrophobically modified poly(vinylpyrrolidone-co-dimethylaminoethylmethacrylate) (referred to herein in short as "HMPVM") in lbs/Mgal (hydrophobically modified water-soluble polymer) and a second sealant composition was evaluated without the hydrophobically modified water-soluble polymer. The symbol "-" indicates that the particular constituent in Table 9 was not included in the sealant composition. Finally, air (gas) was incorporated into the sealant compositions by high shear agitation of each sealant composition until a foam quality of 50% was achieved. The foamed sealant compositions were placed at RT, at 90.6° C. (195° F.), and at 176.7° C. (350° F.) for 18 hours. Thereafter, the foam stability of each sample was determined by visual observation in accordance with Example 1.

The results are shown in Table 9 and demonstrate that at the elevated temperature of 176.6° C., the presence of HMPVM in combination with the welan gum enhanced the stability of the sealant composition.

TABLE 9

| Density Segregation Prevention Agent | Density Segregation Prevention Agent (lbs/Mgal) | HMPVM (lbs/Mgal) | Foam Stability @ RT | Foam Stability @ 90.6° C. | Foam Stability @ 176.7° C. |
|---|---|---|---|---|---|
| Welan Gum | 45 | — | Stable | Stable | Unstable |
| Welan Gum | 45 | 32 | Stable | Stable | Stable |

Example 11

In this example, the viscosities of the sealant compositions described herein comprising one of two hydrophobically modified water-soluble polymers were evaluated. One control sample was tested that did not comprise a hydrophobically modified water-soluble polymer for comparison. Each sample, including the control samples and the test samples, was prepared identically, except that no hydrophobically modified water-soluble polymer was added to the control sample.

The crosslinkable polymer composition for use in the sealant composition was prepared using 350 gal/Mgal of an acrylamide-co-t-butylacrylate copolymer (crosslinkable organic polymer) and 40 gal/Mgal of polyethyleneimine (crosslinker) in 7% KCl solution. To the crosslinkable polymer composition, 1% by volume of cocoamidopropyl betaine (zwitterionic surfactant) and 45 lbs/Mgal welan gum (density segregation prevention agent). In one test sample, 5 lbs/Mgal of HMPDM was included in the sealant composition. In a second test sample, 32 lbs/Mgal of HMPVM was included in the sealant composition. Finally, air (gas) was added to the test sealant compositions by blending each test sealant composition until a foam quality of 50% was achieved. The viscosities in centipoise (cP) of the control and foamed sealant compositions were evaluated at 1 rpm, 3 rpm, 30, rpm, 60 rpm, 100 rpm, 200 rpm, 300 rpm, and 600 rpm. The indicator "OS" refers to "off scale," indicating that the viscosity could not be determined because it was too small to be measured with the instrument used. The symbol "-" indicates that the particular constituent in Table 10 was not included in the sealant composition.

The results shown in Table 10 demonstrate that the presence of the HMPDM or the HMPVM together with the density segregation prevention agent increased the low shear viscosity of the sealant composition greater than without the presence of the HMPDM and the HMPVM. This demonstrates that the presence of the hydrophobically modified water-soluble polymer may be used in the sealant compositions without adversely affecting the desired viscoelastic behavior of the compositions.

TABLE 10

| Hydrophobically Modified Water-Soluble Polymer | Hydrophobically Modified Water-Soluble Polymer (lbs/Mgal) | 1 rpm (cP) | 3 rpm (cP) | 30 rpm (cP) | 60 rpm (cP) | 100 rpm (cP) | 200 rpm (cP) | 300 rpm (cP) | 600 rpm (cP) |
|---|---|---|---|---|---|---|---|---|---|
| — (CONTROL) | — | 5999 | 2700 | 700 | 495 | 396 | 301 | 265 | OS |
| HMPDM (TEST) | 5 | 7999 | 3500 | 840 | 525 | 375 | 360 | OS | OS |
| HMPVM (TEST) | 32 | 8999 | 4100 | 900 | 550 | 360 | 358 | OS | OS |

Example 12

In this example, the ability of the density reducing agents without gas to reduce the density of the sealant compositions described herein to form the reduced density sealant compositions are evaluated. The crosslinkable polymer composition for use in the sealant composition was prepared using 350 gal/Mgal of an acrylamide-co-t-butylacrylate copolymer (crosslinkable organic polymer) and 60 gal/Mgal of polyethyleneimine (crosslinker) in 7% KCl solution. To the crosslinkable polymer composition, diutan in lbs/Mgal (density segregation prevention agent) in the amounts shown in Table 11 was added and 20 g/150 ml of hollow glass particulates (particulate density reducing agent) were added to form the reduced density sealant compositions. The hollow glass particulates had a specific gravity of about 0.32 g/ml. The density of the reduced density sealant compositions was determined and a visual observation of whether the reduced density sealant compositions separated into one or more layers was made.

The results are shown in Table 11 and demonstrate that even with a substantially reduced amount of density separation prevention agent, the density of the reduced density sealant composition may be maintained at a low-density value by including hollow glass particulates as a density reducing agent. However, the presence of at least a minimal value of the density segregation prevention agent in combination with the density reducing agent may be needed to ensure that the reduced density sealant composition does not separate. In a separate experiment, the density of a control composition identical to the compositions in this example but without the particulate density reducing agent was measured to be about 1.05 g/ml (or 8.75 ppg). The density measurements demonstrate that the density of the sealant compositions described herein can be reduced with the addition of the particulate density reducing agents.

TABLE 11

| Diutan (lb/Mgal) | Hollow Glass Particulates (g/150 ml) | Density g/ml (ppg) | Separation? |
|---|---|---|---|
| 1.5 | 20 | 0.77 (6.41) | Yes |
| 10 | 20 | 0.77 (6.41) | No |

Example 13

In this example, the ability of the density reducing agents in combination with gas to reduce the density of the sealant compositions described herein to form the reduced density sealant compositions are evaluated. The crosslinkable polymer composition for use in the sealant composition was prepared using 350 gal/Mgal of an acrylamide-co-t-butylacrylate copolymer (crosslinkable organic polymer) and 60 gal/Mgal of polyethyleneimine (crosslinker) in 7% KCl solution. To the crosslinkable polymer composition, welan gum in lbs/Mgal (density segregation prevention agent) in the amounts shown in Table 12. In some of the sealant compositions, a cocoamidopropyl betaine (zwitterionic foaming surfactant) in volume % was included in the amounts shown in Table 12 and in some of the sealant compositions, 40 g/150 ml of hollow glass particulates (density reducing agents) were added. Finally, air (gas) was added to the sealant compositions by blending each test sealant composition until the foam quality shown in Table 12 was achieved. The symbol "-" indicates that the particular constituent in Table 10 was not included in the sealant composition. The density of the compositions were determined and a visual observation of whether the sealant composition (with gas only) and the reduced density sealant compositions (with gas and density reducing agents) separated into one or more layers was made.

The results are shown in Table 12 and, like Example 12, demonstrate that a substantially reduced amount of density separation prevention agent may be used in combination with a density reducing agent, such as hollow glass particulates, to achieve the same or similar low-density results, even in combination with a gas. Again, the presence of at least a minimal value of the density segregation prevention agent in combination with the density reducing agent may be needed to ensure that the reduced density sealant composition does not separate. The measured density values of reduced density sealant compositions compared to the control fluid described in Example 12, having a density of 1.05 g/ml (8.75 ppg), indicate that a density reduction of about 75% may be achieved with a combination of gas and particulate reducing agents, and a density reduction of about 66% may be achieved with the addition of particulate reducing agents alone.

TABLE 12

| Welan Gum (lb/Mgal) | Zwitterionic Surfactant (vol %) | Hollow Glass Particulates (g/150 ml) | Foam Quality | Density g/ml (ppg) | Phase Separation |
|---|---|---|---|---|---|
| 75 | 4 | — | 70 | 0.31 (2.6) | No |
| 1 | 1 | 35 | 35 | 0.40 (3.3) | Slight |
| 5 | 1 | 35 | 35 | 0.40 (3.3) | No |

Therefore, the embodiments herein are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a sealant composition comprising an aqueous base fluid, a crosslinkable polymer composition, and a density segregation prevention agent,
wherein the crosslinkable polymer composition comprises a crosslinkable organic polymer and a crosslinker, wherein the crosslinker is an organic polymer, an organic copolymer, or any combination thereof;
introducing a particulate density reducing agent into the sealant composition,
wherein the particulate density reducing agent causes the sealant composition to adopt a reduced density as compared to the sealant composition without the particulate density reducing agent, thereby creating a reduced density sealant composition;
introducing the reduced density sealant composition into a subterranean formation; and
crosslinking the reduced density sealant composition into a gel to form a seal in the subterranean formation;
wherein the density segregation prevention agent is selected from a welan gum and a diutan, and the density segregation agent provides stability to the sealant composition against settling, density segregation, and/or phase separation, wherein upon injection of a gas, bubbles form within the gel and a size of the bubbles is uniform for at least a period of about 18 hours.

2. The method of claim 1, wherein the crosslinkable organic polymer is an acrylamide-based polymer; any copolymer thereof; and any combination thereof.

3. The method of claim 1, wherein the crosslinkable organic polymer is selected from the group consisting of a polyacrylamide; an acrylamide copolymer; an acrylamide-co-t-butylacrylate copolymer; a 2-acrylamido-2-methylpropane sulfonic acid/acrylamide copolymer; a sulfonated styrene/maleic anhydride copolymer; a vinylpyrrolidone/2-acrylamido-2-methylpropane sulfonic acid/acrylamide terpolymer; a 2-acrylamido-2-methylpropane sulfonic acid/N—N-dimethylacrylamide/acrylamide terpolymer; a polyketone; any derivative thereof; and any combination thereof.

4. The method of claim 1, wherein the crosslinker is an amine-containing polymer; any copolymer thereof; and any combination thereof.

5. The method of claim 1, wherein the crosslinker is selected from the group consisting of a polyalkyleneimine; a polyalkylenepolyamine; a polyfunctional aliphatic amine; a chitosan; a polylysine; a vinyl alcohol/vinylamine copolymer; any derivative thereof; and any combination thereof.

6. The method of claim 1, wherein the crosslinkable organic polymer and the crosslinker are water-soluble.

7. The method of claim 1, wherein the particulate density reducing agent is selected from the group consisting of a deformable low-density particulate; a non-deformable low-density particulate; and any combination thereof.

8. The method of claim 7, wherein the deformable low-density particulate is selected from the group consisting of a hollow elastomer; a solid elastomer; an elastomer encapsulating a droplet of a volatile organic fluid; and any combination thereof.

9. The method of claim 8, wherein the elastomer forming the deformable low-density particulate is selected from the group consisting of an ethylene-propylene rubber; an ethylene-propylene-diene rubber; a styrene-butadiene copolymer; an acrylonitrile-butadiene-styrene rubber; a vinylidenefluoride homopolymer; a vinylidenedichloride polymer; a vinylidenedichloride copolymer; and any combination thereof.

10. The method of claim 7, wherein the non-deformable low-density particulate is selected from the group consisting of a hollow glass particulate; a hollow fly ash particulate; a solid fly ash particulate; a hollow polypropylene particulate; a solid polypropylene particulate; a hollow polyethylene particulate; a solid polyethylene particulate; a hollow polystyrene particulate; a solid polystyrene particulate; a hollow polyacrylate particulate; a solid polyacrylate particulate; and any combination thereof.

11. The method of claim 1, wherein the density segregation prevention agent is a welan gum.

12. A method comprising:
providing a sealant composition comprising an aqueous base fluid, a crosslinkable polymer composition, a density segregation prevention agent, and a gas,
wherein the crosslinkable polymer composition comprises a crosslinkable organic polymer selected from an acrylamide-based polymer any copolymer thereof or any combination thereof and a cross-linker selected from an amine-containing polymer, any copolymer thereof, or any combination thereof;
introducing a particulate density reducing agent into the sealant composition,
wherein the particulate density reducing agent is selected from the group consisting of a deformable low-density particulate; a non-deformable low-density particulate; and any combination thereof,
wherein the particulate density reducing agent causes the sealant composition to adopt a reduced density as compared to the sealant composition without the particulate density reducing agent, thereby creating a reduced density sealant composition;

introducing the reduced density sealant composition into a subterranean formation; and crosslinking the reduced density sealant composition into a gel, to form a seal in the subterranean formation, wherein the gas in the sealant composition forms bubbles in the gel;

wherein the density segregation prevention agent is selected from a welan gum and a diutan, and the density segregation agent provides stability to the sealant composition against settling, density segregation, and/or phase separation whereby a size of the bubbles is uniform for at least a period of about 18 hours;

wherein the reduced density sealant composition comprising the gas has a foam quality in the range of from about 30% to about 80%.

13. The method of claim 12, wherein the crosslinkable organic polymer is selected from the group consisting of a polyacrylamide; an acrylamide copolymer; an acrylamide-co-t-butylacrylate copolymer; a 2-acrylamido-2-methylpropane sulfonic acid/acrylamide copolymer; a sulfonated styrene/maleic anhydride copolymer; a vinylpyrrolidone/2-acrylamido-2-methylpropane sulfonic acid/acrylamide terpolymer; a 2-acrylamido-2-methylpropane sulfonic acid/N—N-dimethylacrylamide/acrylamide terpolymer; a polyketone; any derivative thereof; and any combination thereof.

14. The method of claim 12, wherein the crosslinker is selected from the group consisting of a polyalkyleneimine; a polyalkylenepolyamine; a polyfunctional aliphatic amine; a chitosan; a polylysine; a vinyl alcohol/vinylamine copolymer; any derivative thereof; and any combination thereof.

15. The method of claim 12, wherein the sealant composition further comprises a stabilizer selected from the group consisting of a foaming surfactant; a hydrophobically modified water-soluble polymer; and any combination thereof;

wherein the combination of the density segregation agent and the stabilizer provides an enhanced stability in a composition to the sealant composition against settling, density segregation, and/or phase separation whereby a size of the bubbles is uniform for at least a period of about 18 hours at a temperature in the range of about 25° C. to about 176.7° C.;

wherein the enhanced stability is not observed in a sealant composition having only a stabilizer or only a density segregation prevention agent.

16. The method of claim 15, wherein the hydrophobically modified water-soluble polymer is formed by hydrophobic modification of a hydrophilic polymer.

17. The method of claim 15, wherein the hydrophobically modified water-soluble polymer is formed by a polymerization reaction of a hydrophilic monomer and a hydrophobically modified hydrophilic monomer.

18. The method of claim 15, wherein the foaming surfactant is selected from the group consisting of a nonionic surfactant; an anionic surfactant; a cationic surfactant; an amphoteric surfactant; a zwitterionic surfactant; and any combination thereof.

* * * * *